Jan. 20, 1970   R. B. CLARK ET AL   3,490,567
ENGINE WITH HYDRODYNAMIC RETARDER
Filed June 12, 1968   2 Sheets-Sheet 1

INVENTORS
RICHARD B. CLARK
CHARLES T. DARRAGH
BY
ATTORNEYS

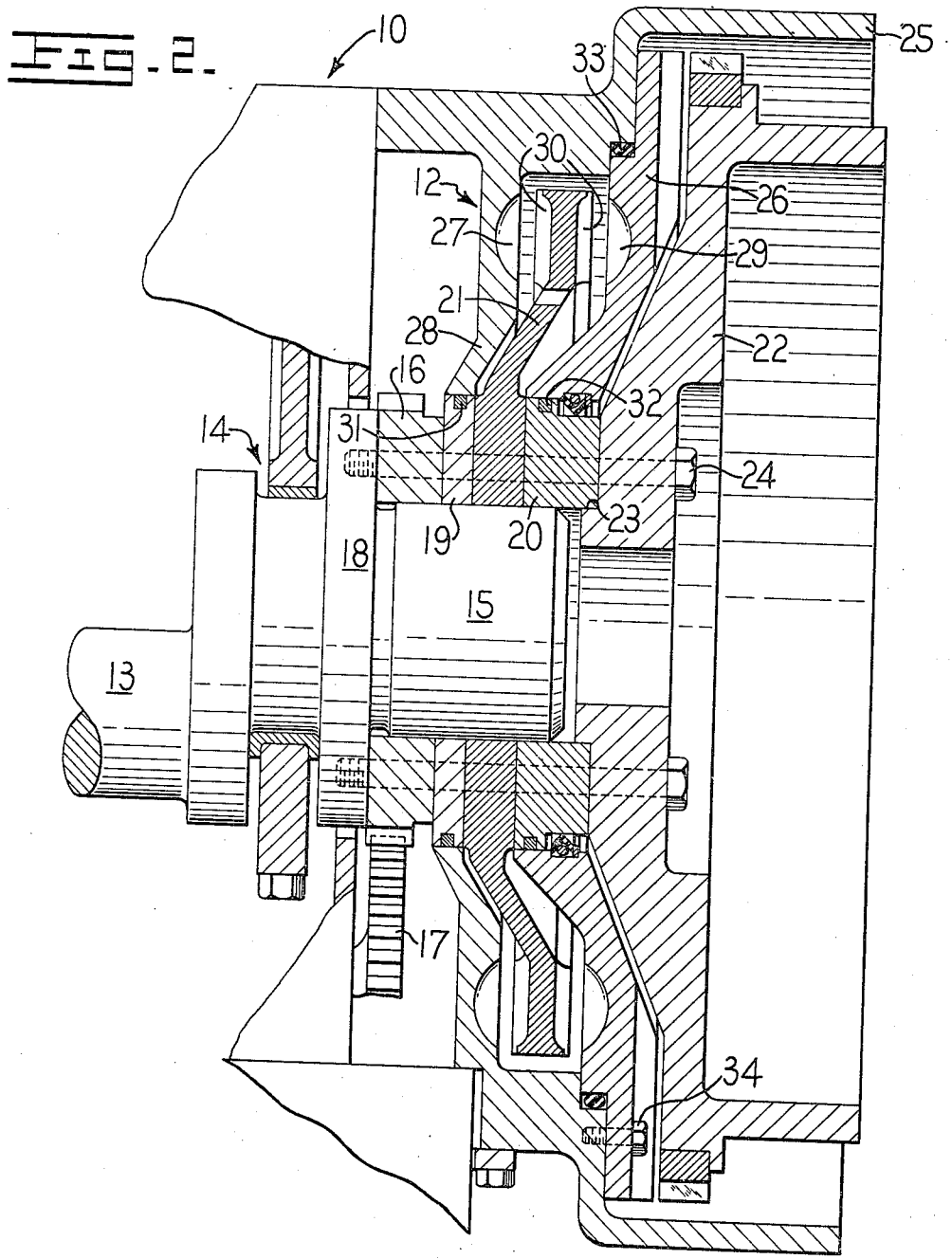

3,490,567
ENGINE WITH HYDRODYNAMIC RETARDER
Richard B. Clark, Washington, and Charles T. Darragh, Peoria, Ill., assignors to Caterpillar Tractor Co., Peoria, Ill., a corporation of California
Filed June 12, 1968, Ser. No. 736,437
Int. Cl. F02d 29/02; F16d 57/00, 67/00
U.S. Cl. 192—3                      11 Claims

ABSTRACT OF THE DISCLOSURE

The rotor of a hydrodynamic retarder is connected directly to the crankshaft of an internal combustion engine. The rotor is positioned between the rear main bearing and flywheel of the engine to be selectively actuated to efficiently brake the vehicle during selected phases of vehicle operation.

---

Figure 1:
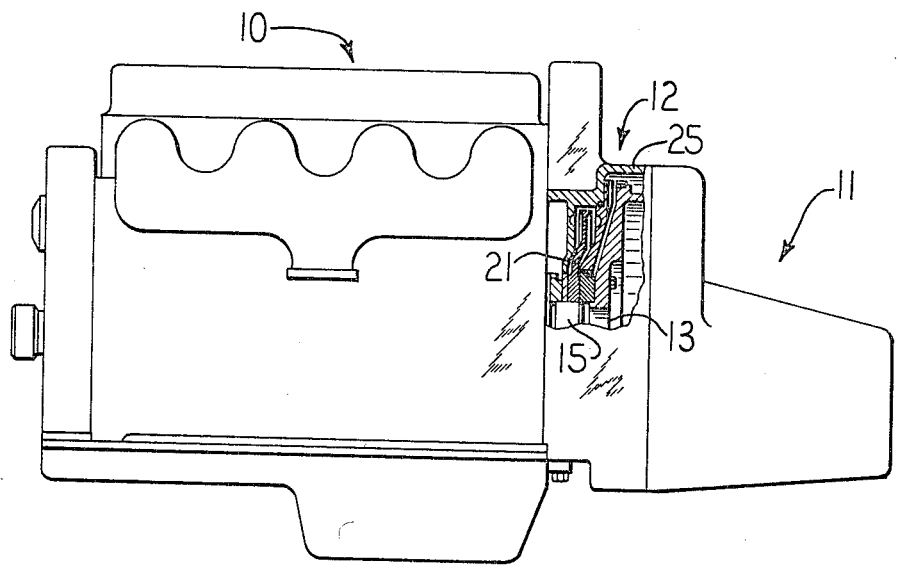

Large earthmoving vehicles, for example, oftentimes require supplemental braking to decrease the vehicle's speed during vehicle operation. Hydrodynamic retarders have been successfully employed to supplement the braking capacity afforded by conventional service brakes when such service brakes are insufficient to effectively brake the vehicle. Conventional retarders are arranged downstream of the engine and oftentimes downstream of the vehicle's transmission to be actuated selectively by suitable control means for supplemental braking purposes.

An object of this invention is to provide a compact and efficient retarder having the rotor thereof attached directly to the engine's crankshaft or power output shaft. The rotor is preferably positioned between the crankshaft's rear-most support bearing and the engine's flywheel to provide a retarder assembly exhibiting a high degree of structural integrity and which is less prone than conventional retarders to cause damage to the engine and attendant components. In addition, the retarder assembly of this invention may be: Expeditiously assembled and disassembled for servicing and like purposes; enclosed by a standard flywheel housing; adapted for use with conventional engine and transmission systems without drastically modifying the support and mounting structures therefor; and adapted to utilize the engine oil pump to supply braking fluid to the retarder.

Other objects of this invention will become apparent from the following description and accompanying drawings wherein:

FIG. 1 is a partially broken, said elevational view of an internal combustion engine and transmission assembly with the hydrodynamic retarder of this invention employed therein; and FIG. 2 is an enlarged, cross-sectional view of the hydrodynamic retarder employed in FIG. 1.

Referring to FIG. 1, a conventional internal combustion engine 10 may be suitably mounted in a vehicle to selectively drive ground engaging wheels thereof via a transmission 11. A hydrodynamic retarder assembly 12 is operatively connected between the engine and transmission to selectively brake the vehicle during selected phases of vehicle operation. The retarder, per se, may be of the type disclosed in U.S. patent application Ser. No. 508,890 entitled "Hydrodynamic Retarder" and filed on November 22, 1965 by Lowell E. Johnson (now U.S. Patent No. 3,352,385), whereas the control system therefor may be of the type disclosed in the U.S. patent application Serial No. 521,320 entitled "Transmission and Control System Therefor" and filed on Jan. 18, 1966 by Joachim Horsch et al. (now U.S. Patent No. 3,386,-540). The latter two applications are assigned to the assignee of this application.

The downstream end of the engine's crankshaft or power output shaft 13 is suitably mounted in the engine by a rear main bearing 14 (FIG. 2) to rotate about a longitudinal axis. An extension 15 of the crankshaft has a timing gear 16 mounted thereon to drive a gear 17 of a conventional timing gear train. A radially projecting flange 18 is formed on the crankshaft to set the axial location of the timing gear and adjacent parts. Annular collars 19 and 20 are also mounted on extension 15 to axially position the retarder's rotor 21 therebetween.

The engine's flywheel 22 has a stepped flange 23 constructed and arranged to receive the right end portion of collar 20 thereon to correctly center the flywheel relative to the longitudinal and rotational axis of the crankshaft. Gear 16, collars 19 and 20 and rotor 21 may be press-fitted onto extension 15 and secured to flange 18 by means of bolts 24. An integral and stationary housing 25 has an annular stator plate 26 secured thereto by bolts 34 to enclose one side of the retarder. The single or multi-part housing further encloses the transmission, flywheel and attendant components therein.

A first series of stator pockets 27 are formed in a circular pattern on a face of a radially and inwardly extending flange 28. A second series of stator pockets 29 form a circular pattern on a face of plate 26 to juxtapose and dynamically balance the first series of stator pockets. Blades are formed at the extremity of the rotor to form a first and a second series of circularly disposed pockets 30 juxtaposed to the first and second series of stator pockets, respectively. Ring seals 31 and 32 and O-ring seal 33 may be suitably arranged to cooperate with opposed sealing surfaces to prevent fluid from escaping from the working chamber of the retarder.

In operation, the operator's selective actuation of suitable control means (not shown) will function to communicate a working fiuid into pockets 27, 29 and 30. Rotation of rotor 21 and thus crankshaft 13 will be retarded in direct proportion to the amount and pressure of the fluid utilized in accordance with well-known principles. For example, the operator may choose to actuate the retarder during descent of the loaded vehicle on a steep grade. It can be seen that positioning of the retarder between bearing 14 and flywheel 22 provides for efficient and expeditious engine and vehicle retardation.

Direct attachment of rotor 21 to the crankshaft functions to transmit braking forces directly to the engine in contrast to conventional systems wherein such forces are initially transmitted through intermediate gearings and attendant mechanisms. Such a compact arrangement further facilitates expeditious assembly and disassembly of the retarder for servicing and like purposes and the use of a common housing 25 to enclose the retarder, flywheel and transmission. Although the teachings of this invention could well be applied to purely mechanical or electrical retarders, such teachings are particularly adapted for use with hydrodynamic retarders. This invention also facilitates use of the engine oil pump to supply braking fluid to the retarder.

What is claimed is:
1. An engine in combination with a hydrodynamic retarder, said engine comprising a power output shaft disposed for rotation about a longitudinal axis, bearing means rotatably mounting said power output shaft in said engine and a flywheel attached to said power output shaft to rotate therewith, said retarder comprising a rotor positioned between said bearing means and said flywheel and attached to said power output shaft to rotate therewith.

2. The invention of claim 1 further comprising a common stationary housing enclosing said retarder and said flywheel.

3. The invention of claim 2 further comprising an annular flange secured to said housing and extending radially inwardly towards said longitudinal axis and a first series of stator pockets for said retarder forming a circular pattern on said annular flange about said longitudinal axis, said rotor having a first series of pockets forming a circular pattern thereon in juxtaposed relationship to said stator pockets.

4. The invention of claim 3 further comprising an annular plate secured to said housing in juxtaposed relationship to said annular flange to enclose said rotor therebetween, said annular plate having a second series of stator pockets forming a circular pattern thereon about said longitudinal axis, said rotor having a second series of pockets forming a circular pattern thereon in juxtaposed relationship to said second series of stator pockets.

5. The invention of claim 1 further comprising a radially projecting flange formed on said power output shaft, first and second collars mounted on said power output shaft and having said rotor positioned therebetween and means for securing said flywheel, first and second collars and said rotor to said radially projecting flange.

6. The invention of claim 5 further comprising a timing gear mounted on said power output shaft between said radially projecting flange and said first collar.

7. The invention of claim 5 further comprising sealing means between said housing and each of said first and second collars for preventing working fluid from escaping from said retarder.

8. In an engine having a crankshaft mounted for rotation therein, a hydrodynamic retarder having a rotor thereof attached directly to said crankshaft to rotate therewith.

9. The invention of claim 8 further comprising bearing means rotatably mounting said crankshaft in said engine and a flywheel attached to said crankshaft to rotate therewith, said rotor attached to said crankshaft between said bearing means and said flywheel.

10. The invention of claim 9 further comprising a radially projecting flange formed on said crankshaft, first and second collars mounted on said crankshaft and having said rotor positioned therebetween and means for securing said flywheel, first and second collars and rotor to said radially projecting flange.

11. In an engine having a crankshaft mounted for rotation therein, a retarder having a rotor thereof attached directly to said crankshaft to rotate therewith, bearing means rotatably mounting said crankshaft in said engine, a flywheel attached to said crankshaft to rotate therewith, said rotor attached to said crankshaft between said bearing means and said flywheel, a radially projecting flange formed on said crankshaft, first and second collars mounted on said crankshaft and having said rotor positioned therebetween and means for securing said flywheel, first and second collars and rotor to said radially projecting flange.

References Cited

UNITED STATES PATENTS

| | | | |
|---|---|---|---|
| 890,272 | 6/1908 | Griffith | 188—99 |
| 1,472,012 | 10/1923 | Leblanc. | |
| 1,948,810 | 2/1934 | Tyler | 123—192 |
| 2,284,515 | 5/1942 | Criswell. | |
| 2,381,755 | 8/1945 | Jameson | 192—3 |
| 2,958,405 | 11/1960 | Glamann | 192—3 |

WENDELL E. BURNS, Primary Examiner

U.S. Cl. X.R.

123—97, 198; 188—90